United States Patent

[11] 3,628,149

[72] Inventor George H. Swan
Middletown, N.J.

[21] Appl. No. 785,274
[22] Filed Dec. 19, 1968
[45] Patented Dec. 14, 1971
[73] Assignee Bell Telephone Laboratories, Incorporated
Murray Hill, N.J.

[54] DIVERSITY SWITCH FOR DIGITAL TRANSMISSION
9 Claims, 5 Drawing Figs.

[52] U.S. Cl. .................... 325/42, 325/56, 325/304, 340/147
[51] Int. Cl. .................... H04b 7/02
[50] Field of Search .................... 325/41, 42, 44, 3, 65, 56, 302, 304; 170/69.5; 340/147, 147 SC

[56] References Cited

UNITED STATES PATENTS

| | | | |
|---|---|---|---|
| 3,188,569 | 6/1965 | Mahoney | 178/69.5 X |
| 3,206,676 | 9/1965 | Sichak | 325/42 X |
| 3,409,875 | 11/1968 | DeTager et al. | 340/146.1 |
| 3,457,511 | 7/1969 | Widl | 325/65 X |

*Primary Examiner*—Robert L. Griffin
*Assistant Examiner*—Benedict V. Safourek
*Attorneys*—R. J. Guenther and E. W. Adams, Jr.

ABSTRACT: A jittering idle channel is tracked to a jittering active channel and diversity switching to the idle channel is provided without loss of a bit. The signal received in the idle channel is written into an elastic store bit-by-bit as it is received; the signal is read out in the order in which it was written at times determined by a timing signal derived from the active signal and modified under control of an error signal indicating a timing difference between the signals on the active and idle channels. There is no built-in preference for one channel, thus either channel may track the other.

INVENTOR
G. H. SWAN
BY Roy M. Porter, Jr.
ATTORNEY

Patented Dec. 14, 1971 3,628,149

4 Sheets-Sheet 2

FIG. 4

| COL 1 | COL 2 | COL 3 | COL 4 | COL 5 | COL 6 | COL 7 |
|---|---|---|---|---|---|---|
| | ACTIVE ROUTE | | | IDLE ROUTE | | |
| SIGNAL BIT $S_i$ | ARRIVAL TIME $T_i \pm \delta_i$ | CELL ASSIGNED (10 CELLS) | READ TIME (5 BIT OCCUPANCY) | ARRIVAL TIME $T_j \pm \Delta_j$ | CELL ASSIGNED (10 CELLS) | READ TIME (WHEN IN SYNC) |
| $S_1$ | $T_1 \pm \delta_1$ | C1 | $T_6 \pm \delta_6$ | $T_3 \pm \Delta_3$ | C4 | $T_6 \pm \delta_6$ |
| $S_2$ | $T_2 \pm \delta_2$ | C2 | $T_7 \pm \delta_7$ | $T_4 \pm \Delta_4$ | C5 | $T_7 \pm \delta_7$ |
| $S_3$ | $T_3 \pm \delta_3$ | C3 | $T_8 \pm \delta_8$ | $T_5 \pm \Delta_5$ | C6 | $T_8 \pm \delta_8$ |
| $S_4$ | $T_4 \pm \delta_4$ | C4 | $T_9 \pm \delta_9$ | $T_6 \pm \Delta_6$ | C7 | $T_9 \pm \delta_9$ |
| $S_5$ | $T_5 \pm \delta_5$ | C5 | $T_{10} \pm \delta_{10}$ | $T_7 \pm \Delta_7$ | C8 | $T_{10} \pm \delta_{10}$ |
| $S_6$ | $T_6 \pm \delta_6$ | C6 | $T_{11} \pm \delta_{11}$ | $T_8 \pm \Delta_8$ | C9 | $T_{11} \pm \delta_{11}$ |
| $S_7$ | $T_7 \pm \delta_7$ | C7 | $T_{12} \pm \delta_{12}$ | $T_9 \pm \Delta_9$ | C10 | $T_{12} \pm \delta_{12}$ |
| $S_8$ | $T_8 \pm \delta_8$ | C8 | $T_{13} \pm \delta_{13}$ | $T_{10} \pm \Delta_{10}$ | C1 | $T_{13} \pm \delta_{13}$ |

4 Sheets-Sheet 4

DIVERSITY SWITCH FOR DIGITAL TRANSMISSION

BACKGROUND OF THE INVENTION

This invention relates to diversity switching in digital transmission systems, and more particularly to providing time synchronization of an idle channel and an active channel to achieve hitless switching between them.

In terrestrial and satellite digital transmission systems route diversity may be employed to provide high reliability. A number of different transmission routes are operated between two points and upon failure or degradation of one route, another is automatically switched into service to replace the faltering route. Of course, the lengths of the routes must be electrically similar so that a switch from one to another will not introduce errors such as misframing.

Where the two points are fixed, such as in terrestrial or stationary satellite microwave systems, any difference in route length can be compensated for by inserting appropriate fixed delay in the shorter routes to equalize the nominal lengths. Maintenance of the equalization will require, however, continuous automatic adjustment. Natural phenomena vary the electrical path lengths of the individual radio hops comprising the route and this causes the absolute delay of the various routes to jitter slowly with time. A primary source of this jitter is path length variation resulting from wind-induced antenna movement normally caused by the sway of the tower or pole on which the antenna is mounted. A secondary source is the change of speed of propagation caused by variation in the refractive index of the atmosphere resulting from temperature and humidity changes. One specific transmission limitation is caused by fading due to rain attenuation. This is especially severe for carrier transmission on the order of 18 GHz and above and route diversity may be employed to achieve reliable transmission.

For low-speed data transmission jitter may be inconsequential or a simple delay line may compensate for jitter, but correction of high-speed transmission exceeds the capability of available delay lines. High-speed bit streams on the order of hundreds of megabits per second may experience jitter which exceeds a bit in size. Diversity switching from one unsynchronized route to another during the occurrence of such jitter could result in an intolerable "hit" resulting from either a loss or addition of a pulse.

An article in the *Nerem Record*, 1960 by C. J. Bryne, M Karnaugh and J. V. Scattaglia entitled "Retiming of Digital Signals with a Local Clock" discloses the use of a buffer memory to dejitterize a digital signal by reading out the data signal at a rate defined by a clock. Retiming such a bit stream through an artificial clock removes the jitter, but such a mechanism is limited by the inherent response frequency of the clock and and loop and is thus incapable of compensating for jitter components below a specific level. The Bryne et al. design, for instance, is ineffective for jitter components below 3 Hz. Wind-induced antenna sway, however, often results in jitter components on the order of 1 Hz. or lower.

Diversity switching of high-speed digital systems requires that the alternative signals be highly synchronized. Dejitterizing two bit streams by use of local clocks is superfluous to the desired result and inadequate for routes experiencing very low frequency jitter. For bistable diversity applications, it is merely desired to continuously adjust the timing of the two channels so that if either bit stream temporarily leads or lags the other it will automatically be returned to synchronization.

It is therefore an object of the present invention to synchronize one bit stream to another to allow bistable diversity switching between them.

It is a further object to provide a diversity mechanism which can track either one of two jittering high-speed bit streams to the other and is capable of compensating for both a leading and lagging tracked bit stream without dejitterizing either signal.

SUMMARY OF THE INVENTION

Hitless diversity switching between the two alternative routes is achieved only when the currently active and currently idle channels are in time synchronization at the instant of switching. In accordance with the present invention, two independently jittering signals are synchronized by using the active signal as a reference and retiming the idle signal to it. This natural self-timing avoids the limitations imposed by artificial timing sources for each bit stream such as local clocks.

The two bit streams are read into individual elastic stores, bit-by-bit in the order in which they are received. Under normal—or what are called synched conditions—the active and the idle channels are unfaded, the outputs of both elastic stores match in a comparator, and both stores are read with the same timing signal that is derived from the active channel timing. A hitless transfer can now take place if the active channel starts to fade.

If for some reason the active and the idle channel become mismatched the comparator changes state and the read signal for the idle elastic store is stepped to contain periodic gaps of one bit. A one bit gap in the read signal of only one of the two stores causes the stores to change their relative occupancy by one bit. Between these gaps the normal timing signal is present and the comparator compares the two signals in their new relative store occupancy state. When the idle and active output signals reach a state of synch the comparator output ceases and no further stepping takes place. When stepping of the idle channel is taking place the elastic store occupancy is increased by one bit at a time. This can continue even to the point where the occupancy is 100 percent. One step beyond this the occupancy is recycled to 0 percent. The store occupancy has therefore been effectively swept through its range. Initial system layout and equalization assures that within its range the idle read timing will lock onto the active read timing. The period of the single bit stepping sequence is determined by the response time of the comparator. The faster the comparator response time the faster the stepping cycle. Thus the idle bit stream tracks the active one, with the active jittering bit stream acting as a timing reference for the jittering idle bit stream. Without dejitterizing either channel, switching from one to the other produces transfer without loss or addition of a bit. The switch is entirely bistable so that either channel may be active and hence act as a reference for the other.

BRIEF DESCRIPTION OF THE DRAWING

FIG. 4 is a table presenting one example of the operation of the invention; and

DETAILED DESCRIPTION

Figure 1:
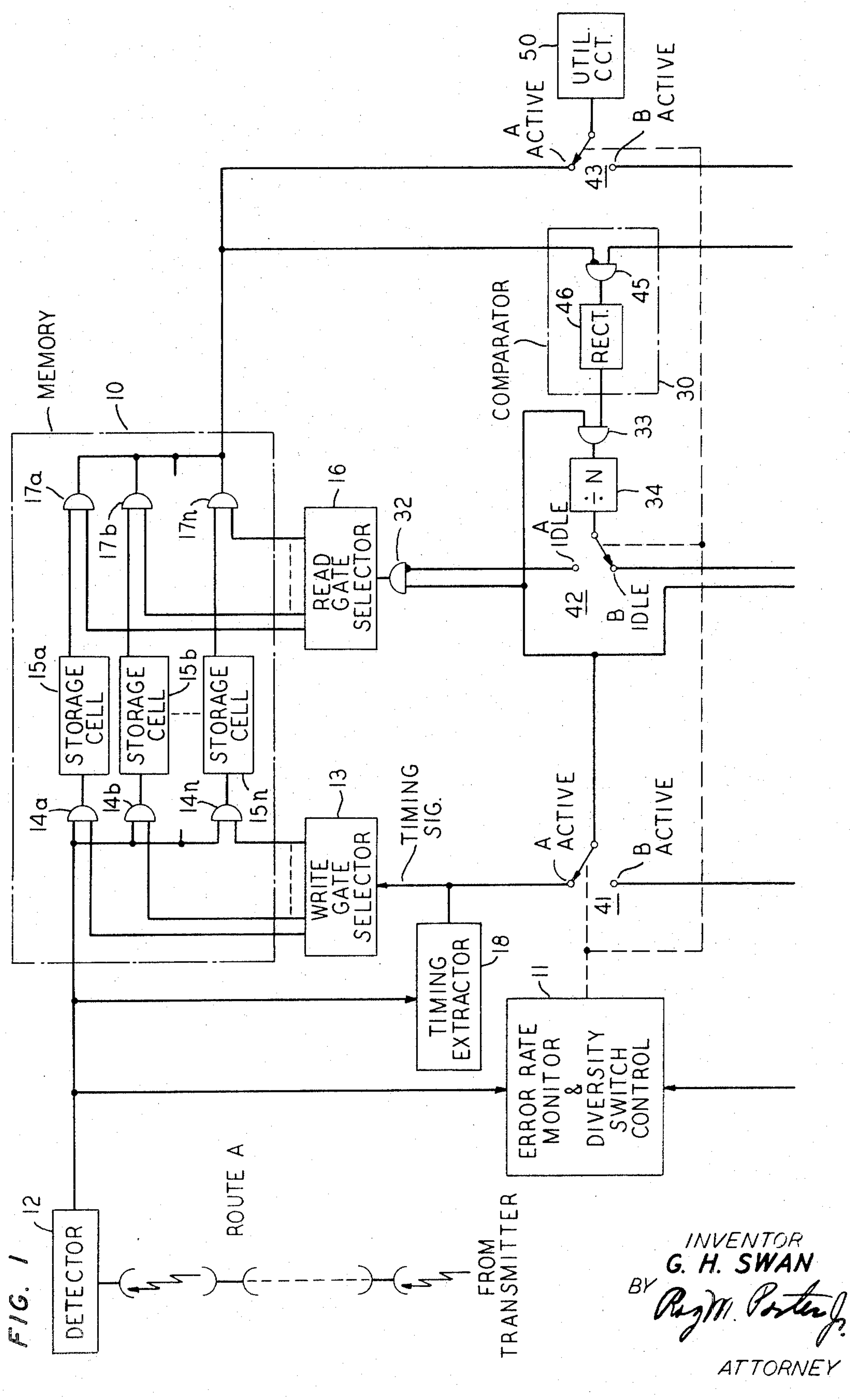
FIGS. 1, 2 and 3 of the drawing illustrate a diversity switch with an equalization mechanism in accordance with the invention.
Figures 2, 3:
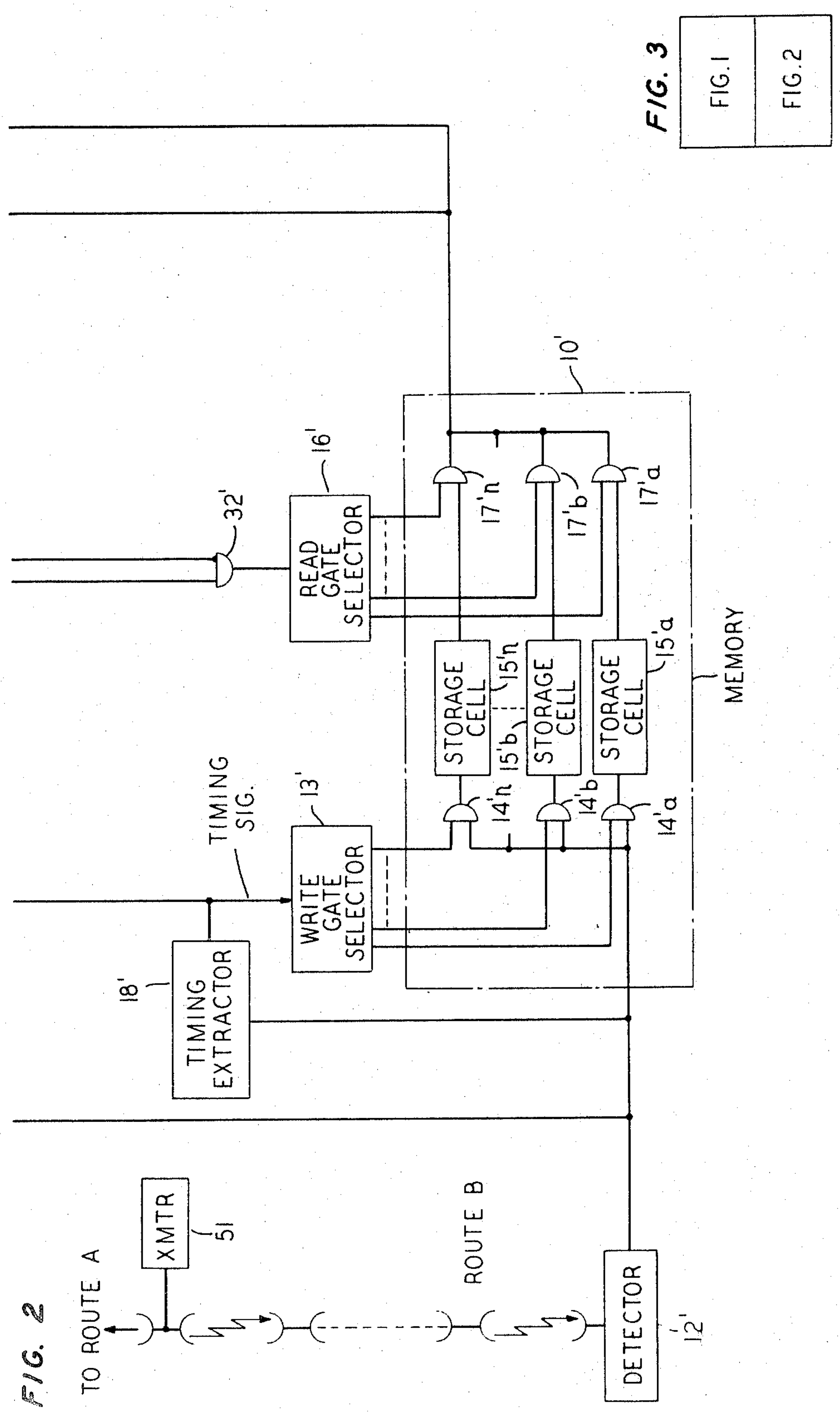

The present invention illustrated in FIGS. 1, 2 and 3 permits digital information from a single transmitter 51 to reach a utilization circuit 50 via either of two multiple-hop routes, A or B. Transmission is applied simultaneously to both routes whose path lengths are equalized in a conventional manner such as by insertion of fixed delay in the shorter path. Thus, identical signals would arrive at detectors 12 and 12′ were it not for natural phenomena such as wind and atmospheric changes. Detectors 12 and 12′ remove information-carrying bit streams from the carrier and deliver this signal to gates 14*a* through 14*n* and 14′*a* through 14′*n* respectively. Simultaneously, the signals from detectors 12 and 12′ are sampled and fed to error monitor and diversity switch control 11 which compares the two and activates ganged switches 41, 42 and 43 when the active route becomes inadequate and if the idle route is superior. Switch activation is timed to occur at the midpoint in time between successive pulses of the active bit stream. Control 11 may be a conventional device sensitive, for instance, to a predetermined bit error rate.

Assume that route A is active and route B is idle as is illustrated. So long as control 11 senses no insufficiency of the reception on route A, no switching will take place. The signal from detector 12 is monitored and a timing signal is produced by timing extractor 18. The timing signal is a pulse train indicating the successive time slots of the active bit stream and is fed to write gate selector 13 which controls access to memory 10. Selector 13 successively passes each monitored pulse to a successive AND-gate 14*a* through 14*n*. The baseband signal is applied to gates 14*a* through 14*n* and an output results only when selector 13 activates the gate and thus successive pulses are read into storage cells 15*a* through 15*n* as they are received. The same monitored signal which was fed to selector 13 is also fed to read gate selector 16 through switch 41 and AND-gate gate 32, which passes the signal directly since the inverted input is open at switch 42. The read sequence should preferably be established such that one-half of the capacity of memory 10 is occupied. Selector 16 operates with gates 17*a* through 17*n* similarly to the operation of selector 13 and gates 14*a* through 14*n*. Thus, the pulses read into storage cells 15 are read out at the same rate, delayed only by the occupancy factor of memory 10.

Meanwhile, selector 13' and gates 14'*a* through 14'*n* operate to write the route B bit train into storage cells 15'*a* through 15'*n* of memory 10' at the rate and in the order in which they are detected by detector 12'. However, since switch 41 is in the A active position, read gate selector 16' is not activated by the timing of the pulses on route B, rather it is activated by the timing of the pulses on route A.

The two bit streams emanating from read gates 17 and 17' are identical but they may be out of synchronization. If the difference is no greater than the storage occupancy of active memory 10, correction results. Bit by bit, comparator 30 compares the bits received in both routes and produces an error signal such as a DC voltage when the two streams are out of synchronization and emits 0 volts when synchronization exists. Comparator 30 may be simply an AND-gate 45 in series with a full-wave rectifier 46. One of the two inputs to gate 45 is inverted as indicated and thus gate 45 produces a zero output if the two inputs are synchronized. Out of synchronization inputs produce an error bit stream which is integrated by rectifier 46 to produce the DC error voltage.

The DC error signal causes a stepping circuit composed of gate 33, divide by N-circuit 34 and gate 32' to change the store occupancy of idle store 15'. By overriding the active timing signal for one pulse by means of the inverted input to gate 32' and hence causing read selector 16' to delay activating one of gates 17' for one time slot, the store occupancy of idle store 15' is increased by one bit and the readout of the idle bit stream is delayed by one time slot.

This stepping recurs once every N bits if the two bit streams are out of synchronization at that time, until comparator 30 ceases to produce a DC voltage, that is, until the two bit streams are locked in synchronization. N is the number of bits which must be sampled by comparator 30 in order to insure an accurate determination of the synchronization status (thus avoiding incorrect synchronization indications from a bit error. The idle bit stream readout now tracks the active one since the relative occupancy of stores 15 and 15' have been adjusted to compensate for any difference between the timing of the bit streams received from routes A and B.

If the idle bit stream leads the active one, then the step-by-step increase in occupancy will slow the readout and bring the idle output into synchronization. If the idle bit stream is lagging, however, then the increase will cause the occupancy of idle store 15' to increase until the maximum occupancy is reached and the next step causes it to recycle to the smallest occupancy. Thus, so long as the lag does not exceed the occupancy of the active store 15, recycling results in the idle bit stream leading the active one and correction occurs as is described above.

The storage in route B (the idle route) acts as a cushion absorbing incoming pulses as they are received and reading them out in synch with the active route so that identical pulses are read out of the active and idle stores simultaneously. Since the routes are nominally of identical path length the cushion need only be provided temporarily while the disturbing atmospheric condition exists. Thus, for difference anticipated conditions difference storage capacity is required.

Route B may, of course, be the active channel in which case switches 41, 42 and 43 would be in reverse positions from that illustrated but the circuit would operate identically with the primed elements performing active functions and the unprimed elements performing the idle functions.

For a clearer understanding of the principles of the invention of FIGS. 1, 2 and 3, reference is made to the example tabularized in FIG. 4 in which a storage capacity of 10 bits is assumed for both memories 10 and 10' corresponding to storage cells 15*a* through 15*n* and 15'*a* through 15'*n*, respectively. This size is selected only for purposes of discussion and the actual size would be determined by the actual conditions under which the diversity system will operate. Signal bits, $S_i$, arrive at detector 12 via route A at time $T_i \pm \delta_i$, where $T_i$ is a periodic time and $\delta_i$ is the jitter of the element $S_i$ on route A. The same signal bits, $S_i$, arrive at detector 12' via route B at time $T_j \pm \Delta_j$, where $T_j$ is a periodic time and $\Delta_j$ is the route B jitter factor.

At $T_1 \pm \delta_1$ (column 2) for instance $S_1$ (column 1) is written into memory 10 which is active at that time. $S_1$ is randomly assigned to cell C1 and successive bits to correspondingly successive cells as indicated in column 3. If memory 10 is adjusted to have a five-bit occupancy, cell C1 will be read out five time intervals after arrival upon demand of the active timing signal at $T_6 \pm \delta_6$ as indicated in column 4. Successive bits would be read out five intervals after their being written in as indicated in the corresponding rows of FIG. 4.

The idle route, assumed to be B, is delivering the identical bits $S_i$ offset by some small but random time. $T_i$ and $T_j$ would not likely differ by more than one bit, but for purposes of discussion a difference of two time intervals has been assumed and $S_1$ is designated in column 5 as arriving at $T_3 \pm \Delta_3$ so that an arrival difference of two bits ± jitter exists between the two routes. Since the active memory of 10 bits has a five-bit occupancy, correction of a two-bit difference in either direction is within the circuit's capability.

Column 6 indicates that $S_1$ is arbitrarily assigned to cell C4 of the idle memory and if roughly a three-bit occupancy of the idle memory exists, the active timing signal will call for the readout of cell C4 at $T_6 \pm \delta_6$ which will provide exact synching of both routes. Tracking is then provided by maintaining the three-bit occupancy and reading out successive cells of the idle store on demand of successive indications of the active timing signal at $T_i \pm \delta_i$.

If due to a switch or fade of one bit stream, tracking is lost, the circuit performs a search and lock operation. If the idle memory has a two-bit occupancy, $S_1$ will be read out at $T_5 \pm \delta_5$, $S_2$ at $T_6 \pm \delta_6$ and so forth so that the idle bit stream is leading the active one. Upon sensing this, the stepping circuit will cause the skipping of a readout and hence increase the idle occupancy by one producing readouts of successive bits at times equivalent to $S_1$ at $T_6 \pm \delta_6$, $S_2$ at $T_7 \pm \delta_7$, etc. This provides synchronization as seen by comparing columns 4 and 7. If the lead were greater, successive steppings would be required.

If on the other hand the occupancy were four bits or greater a lagging idle bit stream will result. A detected error will again cause an increase of the occupancy until a full 10 bits is used resulting in readouts of times equivalent to $S_1$ at $T_{13} \pm \delta_{13}$, etc. The next step will recycle the memory to a zero occupancy and readouts equivalent to $S_1$ at $T_3 \pm \delta_3$ will occur causing a leading condition. This would be corrected as indicated above.

It is possible that when a switch occurs from the active to the idle channel a net change in elastic store occupancy can occur. For instance, if the occupancy of the active channel A is 50 percent and the idle channel B is varying from 45 percent to 55 percent then a switch of idle and active channels can cause active channel B to center at 55 percent and idle channel A to track this. As the total number of switches increases the active channel reserve store depletion may continue to accumulate on a random additive basis.

Eventually the offset may reach a point where the tracking capability of the memories is affected. It is estimated that when the reserve store depletion reaches a level at which about 10 percent of the store occupancy remains in one direction and 90 percent in the other, it is necessary to reset the active channel store occupancy to the 50 percent point. Actually, depletion in one direction causes a buildup of reserve in the other and should be followed by a corrective depletion; therefore, it is very unlikely that resetting will be required in a properly designed typical system. The frequency of reset is a design parameter of the system and is controlled by proper selection of store size.

Figure 5:
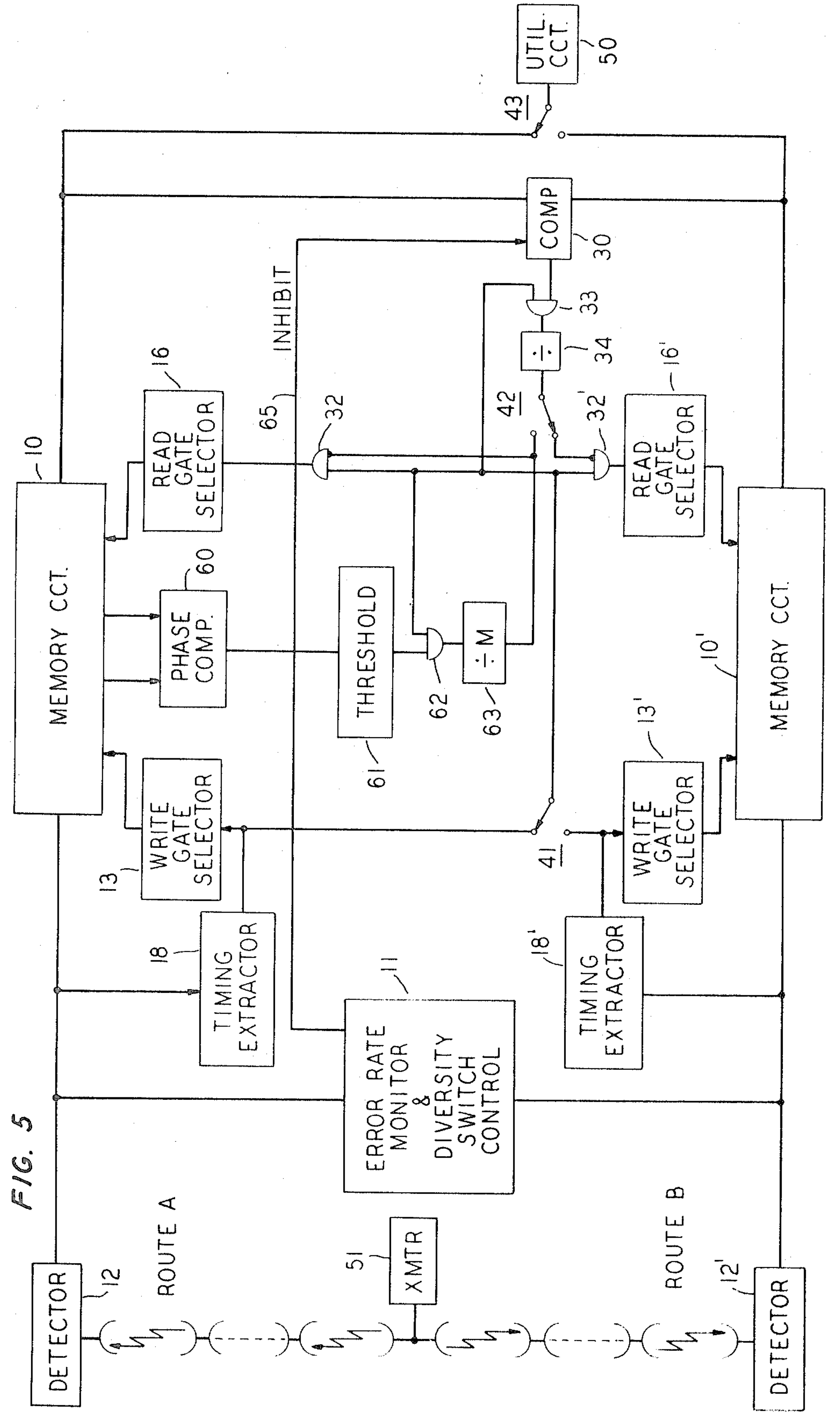
FIG. 5 is a modified embodiment in accordance with the invention.

However, if resetting is needed, a stepping function must be provided for the active channel by a mechanism such as is indicated in FIG. 5. Detection of depletion is provided by phase comparator 60 which compares the write and read timing of a single cell of active memory 10 and generates a signal proportional to the storage duration of a bit. Appropriate conventional threshold detection of the generated signal is provided by threshold detector 61 which provides an output when a selected occupancy such as the 10–90 percent level is reached in either direction. Gate 62, divider circuit 63 and gate 32 act together to step the active readout similarly to the stepping of the idle readout provided by gate 33, divider 34 and gate 32′, except that divider 63 divides by M which is chosen so that the active reset stepping cycle is faster than the idle search stepping cycle to minimize the time that the active circuit must be acted upon.

After resetting the active occupancy the two channels will probably be mismatched in comparator 30 so that a new search and lock of the idle channel will be initiated. A similar reset circuit should be provided to reset memory 10′ when it is active.

FIG. 5 also indicates an inhibit signal path 65 from error rate monitor 11 to comparator 30. This path is energized by monitor 11 when either route or both have faded below an acceptable level. Since such a faded signal is unusable, it would serve no function to continually search for synchronization. The inhibit signal effectively forces an output of ground from comparator 30 hence prevents the initiation of the stepping cycle.

What is claimed is:

1. Diversity apparatus comprising: means for transmitting a plurality of identical digital bit streams, route diversity means for transmitting a plurality of bit streams on diverse transmission paths, each of said paths having independently varying transmission times, means for receiving said plurality of bit streams differing in arrival times of corresponding bits, a plurality of storage means, means for storing said plurality of bit streams bit-by-bit in corresponding ones of said plurality of storage means, means for simultaneously removing from storage corresponding bits of said plurality of bit streams under control of a timing signal, said signal being continuously determined by the varying arrival times of the bits of a selected one of said bit streams, a utilization circuit, and means for selectively connecting one of said plurality of bit streams to said utilization circuit.

2. Diversity apparatus as claimed in claim 1 wherein each of said plurality of storage means is an elastic store having individual write-in and readout control and wherein an identical timing signal controls the readout of said each elastic store.

3. Diversity apparatus as claimed in claim 2 wherein at any one time one of said plurality of bit streams is an active bit stream selectively connected to said utilization circuit and said identical timing signal is extracted from said active bit stream.

4. Diversity apparatus as claimed in claim 3 wherein said idle bit stream is written into an idle elastic store having an occupancy determined by the delay between the write-in and readout of each cell therein and wherein the occupancy of said idle elastic store is periodically increased under control of an error signal, said error signal existing when said active and said idle bit streams read out of their respective stores are out of synchronization.

5. In a digital signal receiver receiving two signals carrying identical digital information, diversity apparatus comprising: a utilization circuit, a diversity switch for selecting one of said two signals and connecting said one signal to said utilization circuit exclusive of the other of said two signals, a first elastic store, means for writing said other signal into said first store at its received rate, extracting means for deriving a timing signal from said one signal, means for reading said other signal from said first store upon demand of said timing signal, comparison means for detecting a timing difference between said one signal and said other signal being read out and producing an error signal during the occurrence of said difference, and first stepping means under control of said error signal for delaying the reading of said other signal whereby said other signal is synchronized with said one signal.

6. Diversity apparatus as claimed in claim 5 wherein said apparatus includes a second elastic store into which said one signal is written and wherein the readout of said first and second elastic stores occurs upon demand of said timing signal and wherein said first stepping means alters the relative occupancy between said first and second elastic stores.

7. Apparatus as claimed in claim 6 wherein said stepping means causes the readout from said first elastic store to fail to read during a single time slot.

8. Apparatus as claimed in claim 7 wherein said apparatus includes a phase comparator for sampling the occupancy of said second elastic store and producing an indication when occupancy exists below or above a preselected threshold and auxiliary stepping means for increasing said occupancy of said second elastic store upon the occurrence of said indication.

9. Apparatus as claimed in claim 5 further including an inhibit circuit for preventing the operation of said first stepping means in the event that said two signals are inadequate for service.

* * * * *